Nov. 11, 1947.                    W. C. ROE                    2,430,737
                                   ADAPTER
                              Filed May 20, 1943
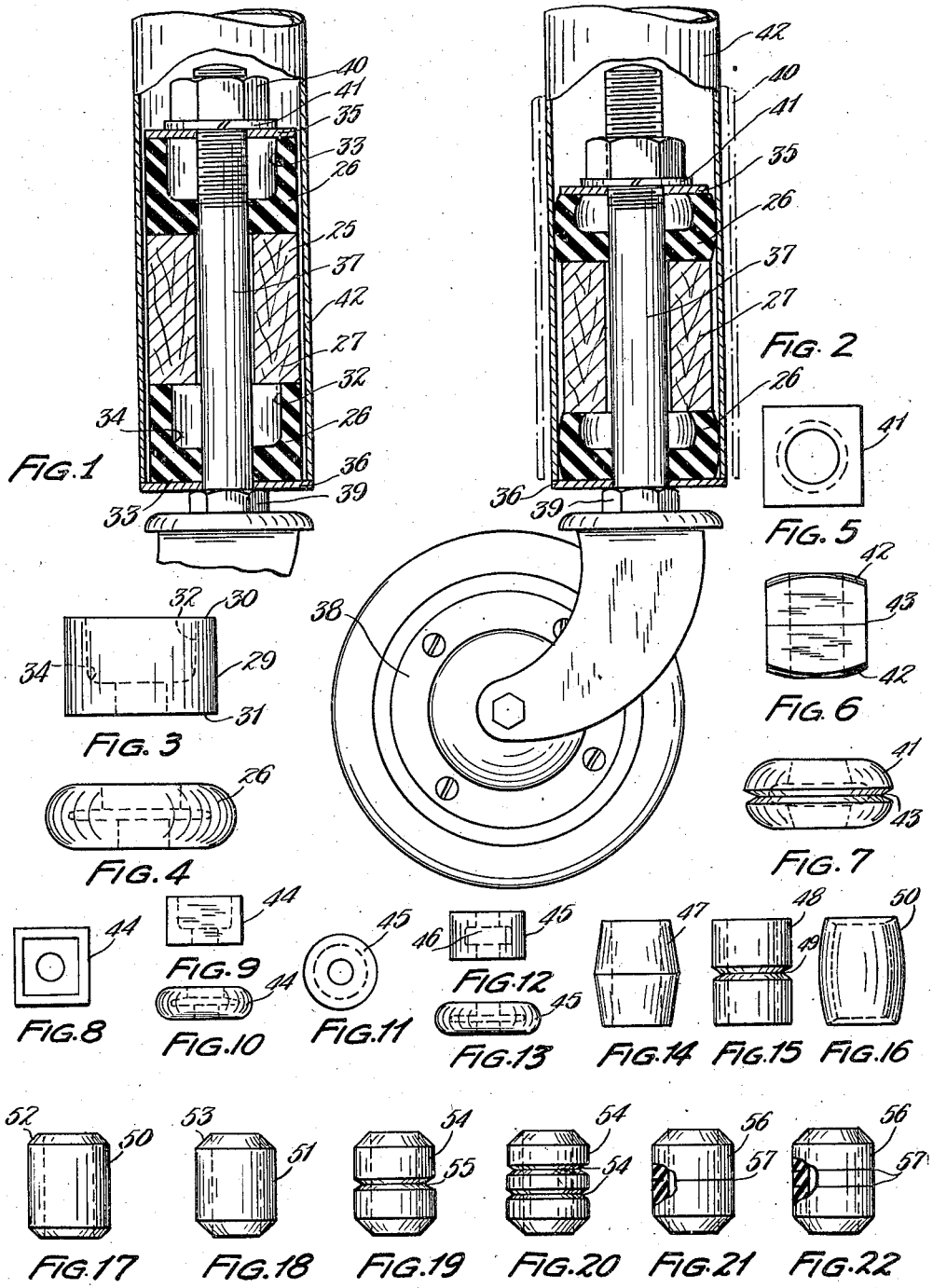
INVENTOR.
WILLIAM C. ROE
BY Patented Nov. 11, 1947

2,430,737

UNITED STATES PATENT OFFICE 2,430,737

ADAPTER

William C. Roe, Elyria, Ohio, assignor to The Colson Corporation, Elyria, Ohio, a corporation of Ohio Application May 20, 1943, Serial No. 487,826

6 Claims. (Cl. 16—39)

This invention relates to adjustable adapters of the type employed for frictionally mounting casters in the ends of furniture tubes or the like, and has for its primary object to provide an improved adapter, simple in construction, efficient in operation, and inexpensive to manufacture and assemble.

Heretofore, most all types of frictional expansion devices have been made of metal, a fact that materially limits their application and necessarily excludes attainment of some otherwise desirable characteristics. A metal expander is further very much limited as to range of adjustment necessitating a large number of sizes to cover the great variety of tube sizes utilized in metal furniture, causes distortion of the tubes due to the small area of contact surface, lacks any resiliency to absorb shock and help maintain the frictional adjustment. It is therefore, a further object of the present invention to provide a resilient expansion means so constructed and mounted as to possess the aforesaid desirable characteristics thus resulting in an adapter far superior to those at present available and having decidedly greater adaptation.

Another object of the present invention is to employ a rubber expansion element on the adapter and preferably a pair of such elements sufficiently spaced apart to counteract the applied forces when under load or in motion.

Another object of the present invention is to specially form the rubber expansion elements so that upon the application of end pressure, the elements will bulge outwardly at their central portion into frictional engagement with the inside of the tube without any danger of distortion of the latter.

Another object of the present invention is to so form the rubber expansion elements that a maximum of expansion is afforded with a minimum of compressive force and still effectively maintain frictional adherence.

Another object of the present invention is to provide an adapter capable of use with either circular or non-circular tubes without necessitating a change of expansion elements if desired.

With the objects above indicated, and other objects hereinafter explained in view, my invention consists in the construction and combination of elements hereinafter described and claimed.

Referring to the drawings,

Figure 1 is a fragmentary vertical sectional view of an adapter inserted in the lower end of a circular tube before compression of the expansion elements.

Figure 2 is a view similar to that shown in Figure 1 but with the expansion elements in compressed condition frictionally engaging the inside of the tube.

Figures 3 and 4 show the shape of the expansion elements in side elevation normally and under maximum compression of the type embodied in Figures 1 and 2 respectively.

Figures 5, 6 and 7 show a modified form of substantially the same expansion element, Figures 6 and 7 being in side elevation and showing the element normally and under maximum compression respectively.

Figures 8, 9, and 10 show a still further modified form being similar to that shown in Figures 3 and 4 but substantially square in cross section.

Figures 11, 12, and 13 show a further modified form of expansion element substantially circular in cross section.

Figures 14 to 22 inclusive, show further modified forms of expansion elements of the solid type which may be circular or non-circular in cross section as desired.

In the drawings I have illustrated one embodiment of the invention but it should be understood that the invention is in no manner to be so restricted and other adaptations will be readily visualized by those skilled in the particular art. As has been heretofore stated, adapters at present available and in common use embody expanders frictionally engageable with the inside of the tube in which the adapter is mounted in a well known manner. The use of metal expanders, however, has numerous objectionable features amongst which are their limited adaptability, distortion of the tube due to small area of contact surface, and the lack of resiliency to absorb shock and help maintain the frictional adjustment.

By substituting rubber for the expansion element, the foregoing limitations are circumvented if the rubber is properly shaped. Besides the special forms of the rubber it is desirable to use two separate and complete expansion elements sufficiently spaced apart to counteract any applied forces when under load in motion.

When a solid block of rubber is used the power required to force the rubber out to a practical range of adjustment is such that it necessitates heavier parts than the tubes will accommodate and the internal pressure on the thin walls is too great. Also the manual force required to adjust the expanders in place is excessive. If, however, the center is relieved, such as cupped, notched, or cut, the pressure required for compression is brought within practical limits and the contour of the outer wall will take the form of a round bulge or a V depending upon whether the rubber is cupped, notched, or cut and to the extent of the indentations or cuts. The angle of the ends also changes the final shape when compressed as does the radius of the inner surface of the cups. With beveled ends and cut sides square rubber expansion elements fit the round tubes and round rubber expansion elements fit the square tubes quite well.

The adapter is generally designated by the numeral 25 and comprises a pair of rubber expansion elements 26 of suitable size spaced apart relatively by a spacer 27 of any suitable inherently rigid material. The spacer 27 should be of the same cross section as that of the expansion elements and preferably the same size, this being controlled by the inside dimension of the tube in which the adapter is to be mounted. In the embodiment illustrated in Figures 1 to 4 inclusive, the rubber expansion elements 26 are what I term cupped. Each of the elements are round in cross section having a straight peripheral wall 29 and flat opposite ends 30 and 31 respectively. The end 30 is cupped at 32 to provide an end wall 33 joined to the peripheral wall by a suitable radius 34. The spacer 27 is made of wood in the present instance and round in cross section preferably of the same diameter as the expansion elements. An expansion element 26 is disposed at each end of the spacer preferably with the open end of one expansion element in engagement with the adjacent end of the spacer and the closed end of the other expansion element in engagement with the opposite adjacent end of the spacer, all in axial alignment, as more clearly shown in Figure 1. A clamping plate 35, of metal or other suitable material, is disposed on the outer end 30 of the inner expansion element and preferably of the same diameter as the latter while a similar clamping plate 36 is disposed on the outer end of the outer expansion element but of slightly larger diameter for a purpose to be later described.

The stud 37, of a caster 38 of well known construction, extends outwardly and is freely disposed centrally within axially aligned openings provided in the clamping plates, expansion elements, and spacer, its outer end being exteriorly screwthreaded. The stud 37 has a relatively stationary collar 39 at its inner end engageable with the outer adjacent face of the clamping plate 36 to permit relative movement in one direction and a nut 40 is threadably mounted on the free end of the stud 37 for cooperative engagement with the clamping plate 35. A lock washer 41 is disposed between the plate and nut to prevent accidental displacement of the latter.

The adapter 25 is freely inserted in the lower end of a furniture tube 42 in the manner illustrated in Figure 1 and with the expansion elements in their normal uncompressed condition, the lower plate 36 abutting the free end of the tube. When the stud is turned from the outside of the tube, the nut 40 is run down on the stud, drawing the two clamping plates toward each other thus compressing the rubber expansion elements at each end of the spacer. This causes the rubber to bulge and expand outwardly, as shown in Figure 2, against the inner wall of the tube to frictionally and resiliently maintain the adapter in operative position. It will be noted that the expansion elements afford relatively large contact areas under compression and that their inherent resiliency provides for the absorption of shocks and bumps. Furthermore, while the rubber elements frictionally maintain the adapter in operative position the pressure exerted is not sufficient to damage or distort the tube. In Figures 3 and 4 the rubber expansion element is shown in uncompressed and fully compressed condition to visualize the range of adaptability to tubes of all intermediate sizes which is quite important when it is appreciated that a different metal expansion element is required for every variation in tube diameters of less than $\frac{3}{32}$ inch. The dot and dash lines in Figure 2 indicating a large diameter tube in which this adapter may be operatively mounted is shown to give some idea of its wide adaptation.

In Figures 5 to 7 inclusive a modified form of rubber expansion element 41 is shown which is square in cross section and substantially solid except for the central opening through which the stud extends. The opposite ends are beveled at 42 for engagement with the spacer and clamping plate, as before described, and in order that the rubber bulges outwardly at its central portion a circumferential cut 43 is provided which extends inwardly about two-thirds of the wall thickness. When the ends are compressed the rubber bulges outwardly as shown in Figure 7, due to the cut and fractionally engages the inside of the tube in which the adapter is mounted.

In Figures 8 to 10 inclusive the rubber expansion element 44 is substantially the same as that shown in Figures 1 and 2 except that it is square in cross section to adapt it for use with square tubes.

In Figures 11 to 13 inclusive the rubber expansion element 45 is similar to that shown in Figures 1 and 2 except that it has an additional integral end wall 46 but a centrally relieved portion.

In Figure 14 a solid rubber expansion element 47 is shown having square ends but a double outwardly tapering peripheral wall. In Figure 15 the rubber expansion element 48 is of the solid type having square outer ends and a notch 49 extending peripherally about the outer surface and positioned midway of the ends. In Figure 16 the rubber expansion element is substantially barrel shaped to effect outward bulging of rubber under compression. In Figures 17 and 18 the rubber expansion elements 50 and 51 respectively are of the solid type having different degrees of beveled edges 52 and 53 thus effecting different relative shapes under compression. In Figures 19 and 20 the rubber expansion elements 54 are of the solid type having beveled ends and in one instance is provided with a single notch 55 and in the other instance with a pair of such notches. In Figures 21 and 22 the rubber expansion elements 56 have beveled outer ends and in one a single peripheral cut 57 is formed therein while the other is provided with a pair of such peripheral cuts. Any of these modified forms of rubber expansion elements can be substituted for those shown in Figures 1 and 2 and may be used in pairs, as preferable, but has individual elements if desired. In all of these modifications some provision is made to insure outward bulging of the rubber under compression and it should be understood that any other feasible means may be adopted.

The figures all show how the rubber expansion elements may be shaped to allow them to function in a practical way. Research demonstrates that rubbers up to about one and one-half inches in diameter will function good and are best made by forming a tube of the proper outside diameter, wall thickness, length and hardness and with the ends beveled and the center cut. The ends are beveled so that the inner wall of the tube contacts the clamping plates and creates a rolling effect on the plates when the rubber is compressed lengthwise. The center of the rubbers midway between the two ends is cut to a depth of two-thirds the wall thickness. When end compression takes place the tapered ends roll outwardly on the plates and at the same time the reduced resistance of the center, due to the cut, causes the rubber to bulge in a circular form. At the moment the outer wall of the rubber contacts the inside of the tube the two ends of the rubber are squeezed closer together compressing the rubber in the form of a circular ring the exact shape depending upon the difference in diameter of the rubber and tube and other characteristics of the rubber unit. Sizes from one and one-half inches or more can best be made and will function to better advantage if the rubber units are formed as cups with the wall thickness, bottom, and inside radius of corner proportioned to suit the application. In practise, when the cup is compressed the side wall bulges to the outside due to the effect of the radius in the inside corner of the cup and the resultant compression form is similar to that of the tubular type. For tubes of over two inches internal diameter an expansion range of approximately one-fourth inch is easily obtained and the expansion elements are readily installed.

The resiliency of the rubber expanders makes the caster more effective in protecting the contacting surfaces and results in longer bearing life by absorbing the sharp shocks.

While I have described the preferred embodiment of the invention it is to be understood that I am not to be limited thereto inasmuch as changes and modifications may be resorted to without departing from the spirit of the invention as defined in the appended claims.

I claim:

1. In an adjustable adapter for mounting a caster or the like in the end of a hollow furniture tube wherein the caster stud extends within the end of the tube and carries one or more annular resilient rubber-like expansion elements coaxially of the stud which upon longitudinal compression are radially expansible to engage the inner surface of said tube and wherein means associated with the caster stud are disposed to bear on opposite ends of such expansion elements to compress the same longitudinally and cause the walls thereof to bend radially outward, the improvement in the expansion element which comprises that at least the annular longitudinal median portion of the wall thereof is not substantially thicker than about one third the length of the element, the outside diameter of said portion being no less than the outside diameter of any other part of the element and substantially less than the inside diameter of said tube, said portion tending to bulge and bend radially outwardly when the ends of the element are forcibly moved toward each other, said annular median portion being firmly engageable with said tube in its bulged state by virtue of the bending of said wall rather than the thickening thereof.

2. The improvement of claim 1 in which said element is substantially cup shaped with one end having an aperture not substantially larger than the caster stud.

3. The improvement of claim 1 in which said element has the inner median surface of its wall recessed and overhung by the end portions thereof.

4. The improvement of claim 1 in which said element has its median wall cut or slitted annularly to less than the full thickness thereof.

5. The improvement of claim 1 in which said annular median portion comprises at least one annular groove or notch formed in the external surface of the wall of said element.

6. An adjustable cushioned mounting for a caster or the like at the end of a hollow tube comprising the combination of a caster stud disposed within the end of said tube and spaced from the interior surface thereof, an annular rubber-like element disposed between said stud and the interior of said tube, said element having a longitudinally extending substantially cylindrical wall portion not substantially thicker when idle than about one third the length of the element, the outside diameter of said element being no less than the outside diameter of any other part of the element and substantially less than the inside diameter of said tube, said portion tending to bulge and bend outwardly under columnar compressive loads, and means associated with said stud for imposing columnar compressive loads upon opposite ends of said element, an annular median part of the said wall of said member being proportioned in respect to parts more nearly adjacent the ends thereof to yield by outward bending under said columnar loads to engage the interior surface of said tube firmly without substantially increasing the thickness of said part of said wall.

WILLIAM C. ROE.

REFERENCES CITED

The following references are of record in the file of this patent:

UNITED STATES PATENTS

| Number | Name | Date |
| --- | --- | --- |
| 780,684 | Pratt | Jan. 24, 1905 |
| 1,919,666 | Patterson | July 25, 1933 |
| 1,927,271 | Noelting | Sept. 19, 1933 |
| 2,155,826 | Herold | Apr. 25, 1939 |
| 2,155,827 | Herold | Apr. 25, 1939 |
| 2,155,828 | Herold | Apr. 25, 1939 |
| 2,207,549 | Noelting | July 9, 1940 |

FOREIGN PATENTS

| Number | Country | Date |
| --- | --- | --- |
| 6,619 | Great Britain | Mar. 29, 1905 |